US007668183B2

(12) United States Patent
Calme et al.

(10) Patent No.: US 7,668,183 B2
(45) Date of Patent: Feb. 23, 2010

(54) FLEXIBLE SIP PROFILE FOR MIXED NETWORKS

(75) Inventors: James A. Calme, Aurora, IL (US); Richard P. Ejzak, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 496 days.

(21) Appl. No.: 11/345,908

(22) Filed: Feb. 2, 2006

(65) Prior Publication Data
US 2007/0177603 A1 Aug. 2, 2007

(51) Int. Cl.
*H04L 12/66* (2006.01)
(52) U.S. Cl. ...................... 370/401; 370/467
(58) Field of Classification Search ............ 370/395.2, 370/352, 356, 401, 88.17, 90.01, 261, 389, 370/392, 400, 465–467, 469
See application file for complete search history.

(56) References Cited

U.S. PATENT DOCUMENTS

| | | | | |
|---|---|---|---|---|
| 6,876,646 | B1* | 4/2005 | Dore et al. | 370/352 |
| 7,142,534 | B1* | 11/2006 | Whent et al. | 370/352 |
| 7,257,109 | B2* | 8/2007 | Sylvain | 370/352 |
| 7,274,687 | B2* | 9/2007 | Luken | 370/352 |
| 7,295,579 | B2* | 11/2007 | Sprague et al. | 370/524 |
| 7,302,495 | B2* | 11/2007 | Luken | 709/239 |
| 2002/0186723 | A1* | 12/2002 | Sprague et al. | 370/524 |
| 2004/0062230 | A1* | 4/2004 | Taylor et al. | 370/352 |
| 2004/0246949 | A1* | 12/2004 | Cannon | 370/352 |
| 2005/0036492 | A1* | 2/2005 | Hoffmann et al. | 370/395.2 |
| 2005/0220078 | A1* | 10/2005 | Luken | 370/352 |
| 2005/0237997 | A1* | 10/2005 | Hoffmann | 370/352 |
| 2006/0019659 | A1* | 1/2006 | Rosenberg et al. | 455/432.1 |

OTHER PUBLICATIONS

RFC 3262, Rosenberg & Schulzrinne, Reliability of Provisional Responses in SIP, Jun. 2002. RFC 3578, Camarillo, et al., ISUP Overlap Signalling to SIP, Aug. 2003.*
Daniel Collins, Carrier Grade Voice Over IP, Published by McGraw-Hill Professional, 2002,ISBN 0071406344, 9780071406345.*
RFC3204, Zimmerer, et al., ISUP and QSIG MIME Objects, Dec. 2001. RFC2976, Donovan, The SIP INFO Method, Oct. 2000.
RFC3398, Camarillo, et al., Integrated Services Digital Network (ISDN) User Part (ISUP) to Session Initiation Protocol (SIP) Mapping, Dec. 2002.*
RFC3372, Vemuri, et al, Session Initiation Protocol for Telephones (SIP-T), Sep. 2002.*
Camarillo, et al, draft-ietf-sipping-isup-06, ISUP to SIP Mapping, Aug. 19, 2002.*

* cited by examiner

*Primary Examiner*—Pankaj Kumar
*Assistant Examiner*—Duc T Duong
(74) *Attorney, Agent, or Firm*—Carmen Patti Law Group, LLC

(57) ABSTRACT

An apparatus in one example has: a plurality of networks operatively coupled to one another, and having respective end points; and a single SIP (Session Initiation Protocol) profile useable by each network of the plurality of networks; wherein two end points, via signaling mechanisms within SIP, negotiate a level of support for ISUP (Integrated Services Digital Network User Part) services that are usable between the two end points.

20 Claims, 8 Drawing Sheets

FLEXIBLE SIP PROFILE FOR MIXED NETWORKS

TECHNICAL FIELD

The invention relates generally to telecommunication networks, and more particularly to interoperability between mixed networks.

BACKGROUND

Since the introduction of the first version of Session Initiation Protocol (SIP) published in 1999, there has been a menagerie of network architectures that have adopted SIP as the protocol to support call control. These networks are of many types, from basic networks using SIP end-to-end to connect SIP user devices, to networks using SIP to bridge between Public Switched Telephone Network (PSTN) gateways, to the latest subsystems in support of next generation networks that are intended to replace existing PSTN networks. Early efforts to describe interworking to the PSTN and support of services within the IP network were document by the IETF PINT (PSTN/Internet Interworking) and SPIRITS (Services in PSTN requesting Internet Services) working groups. These efforts subsequently lead to the formal protocol extensions upon which much of today's SIP based networks and services rely. To allow SIP to continue to evolve new capabilities over time, the IETF has built into SIP version 2.0 several effective mechanisms that allow endpoints to negotiate the use of different capabilities and extensions. The SIP Supported header allows an endpoint to signal which SIP options are supported. The SIP Required header allows an endpoint to signal which SIP options are required to be used during a session. The SIP Accept header indicates which Multipurpose Internet Mail Extensions (MIME) attachments are recognized. There is also a caller preferences mechanism available to indicate a caller's preferences regarding the use of certain SIP features throughout the network.

Even with these useful mechanisms for SIP endpoints to negotiate between themselves to a common set of capabilities, multiple SIP networks have evolved over time into separate islands that cannot always be directly interconnected and may have significant compatibility issues when they are interconnected. As depicted in FIG. 1, these disparate networks 102, 104, 106, 108 in a telecommunication network 100 may require interworking gateways 110, 112, 114, 116, 118, 120 to adapt between nuances of these networks 102, 104, 106, 108. For example, a SIP network based on ITU-T Q.1912.5 profile C (referred to as SIP-I—SIP with encapsulated ISUP (Integrated Services Digital Network User Part)), which is typically configured to bridge PSTN gateways, is designed to support interconnection only between trusted endpoints in a closed network, due to the mandatory use of encapsulated ISUP messages, the presence of information within the encapsulated ISUP messages that is private to the network, conventions regarding early media, and other differences with conventional SIP usage. Any connection to a SIP endpoint outside of a trusted SIP-I domain must be through an appropriate gateway. Other SIP networks have been deployed using various proprietary extensions to support needed customer features, and these networks are not always compatible with one another. Even the IETF version of SIP carrying encapsulated ISUP (SIP for Telephones—SIP-T), which is similar to SIP-I in the use of encapsulated ISUP, is incompatible in design with SIP-I due primarily to differences in their security models. Internet Protocol (IP) Multi-Media Subsystem (IMS) SIP (Q.1912.5 profile A) is incompatible with some of the SIP security extensions defined by the IETF.

Packet technology is being introduced into the Public Switched Telephony Network (PSTN) and Public Land Mobile Network (PLMN). This Session Initiation Protocol (SIP) is being used to provide the call control signaling in these packet networks. but various networks are using different versions (i.e., Profiles) of SIP to support services within these networks. This makes it increasing difficult to allow interconnection between networks while continuing to support the desired and expected level of service. Of particular interest is the continued support of ISUP based services when using SIP. It is necessary to detail the means by which nodes of differing level of support of ISUP information being carried within the SIP signaling are able to interoperate.

The following is an overview of some significant types of SIP networks. Each network has specific requirements on the use of SIP, defining a SIP specific to that network. Each such usage of SIP will be referred to as a SIP profile. In some networks, SIP is used end-to-end to interface to both the user (user-network interface—UNI) as well as between network components (network-network interface—NNI). Even though there are many different organizations and standards bodies defining these networks, it is possible to group SIP networks according to some common characteristics.

FIG. 3 depicts end-to-end native SIP networks. For example, in a telecommunication network 300 a SIP network 302 is operatively coupled to a PSTN 304 via a gateway 306. The SIP network 302 may be operatively coupled to SIP terminals 308, 310, 312, as well as to other SIP networks 314.

Native SIP networks use only the information inherent in "native" SIP headers between endpoints to control session state. SIP allows for the encapsulation of ISUP signaling information as attachments to SIP messages to signal additional PSTN service information not available in SIP, but these "native" SIP networks do not use this feature of SIP. The public Internet, IMS networks and other networks designed to directly serve native SIP terminals typically assume such a use of SIP. These networks use SIP as defined in RFC 3261 with additional "native" SIP extensions defined in other IETF RFCs to support various services, e.g., the Subscribe/Notify capability defined by RFC 3265. The extensions introduce new headers that allow service information to be carried between SIP endpoints. For these networks, standard PSTN supplementary service capabilities are provided to SIP terminals only to the extent that the native SIP is able to carry the associated service information. If the service information cannot be mapped into SIP headers, some or all of the service capabilities are lost. Therefore, when these networks interconnect with either the PSTN or other SIP networks that are able to more fully support the services, interworking will result in a reduction of capabilities. It has historically not been the intention of the IETF to extend SIP to parallel the capabilities of ISUP. Instead those PSTN services emulated within SIP have been modified to more closely match the capabilities of SIP.

FIG. 4 depicts networks that bridge ISUP networks. For example, in a telecommunication network 400 a SIP network 402 may be operatively coupled to a PSTN 404 via a gateway 406. The SIP network 402 may also be operatively coupled to another PSTN 410 via a gateway 408.

Such networks bridge ISUP networks but do not directly support SIP-enabled terminals. These networks use many of the capabilities of native SIP, but supplement those capabilities through the use of encapsulated ISUP to transparently carry additional service information between ISUP networks. Such networks are defined by the SIP-T and SIP-I profiles of SIP. Other network types such as IMS and the TISPAN (Telecoms & Internet converged Services & Protocols for Advanced Networks) simulation network may also bridge ISUP networks during redirection/forwarding scenarios, but that is not their primary role, which is to support SIP-enabled terminals. The use of encapsulated ISUP enables the support of PSTN supplementary services by allowing SIP-to-PSTN/ISUP gateways to make use of the available ISUP information. The SIP header information takes precedence over any encapsulated ISUP. The encapsulated ISUP then fills the gaps where there is no SIP header that is able to carry the service information.

One of the goals of the Next Generation Networks (NGN) emulation model is to provide a replacement for the existing PSTN infrastructure while supporting service transparency. Even though the network infrastructure is being replaced, the user's service experience should be unchanged. The NGN PSTN/ISDN Emulation Subsystem (PES) is a packet switching SIP network that can be realized through two different architectures: softswitch-based and IMS-based.

FIG. 5 depicts an IMS based PSTN/ISDN Emulation Subsystem (PES). For example, in a telecommunication network 500 a PSTN/ISDN Emulation Subsystem (PES) 502 may be operatively coupled to a PSTN 530, to terminals 518, 520 via gateway (GW) 514, to terminals 522, 524 via media gateway (MG) 516, and to application server (AS) 512. The PES 502 may have a S-CSCF 504, I-CSCF 506, P-CSCF 508, AGCF 510, BGCF 526, and MGCF 528.

The IMS-based PES inherits the same network architecture as defined by the 3GPP IMS with a number of modifications. The interface point into the PES has been modified to accommodate the presence of circuit end points such as the basic analogue residential telephones, ISDN phones or Private Branch Exchanges (PBXs). The NNI between the PES components and the Application Servers that provide the subscriber and network services uses encapsulated ISUP to signal supplementary services information. The use of encapsulated ISUP allows ISUP aware entities, e.g., Application Servers supporting PSTN/ISDN emulation logic, to provide feature transparency to the circuit end points when signaling among Application Servers and PSTN gateways. The UNI does not require ISUP encapsulation but does need other extensions not discussed herein to control interactions with end-user devices.

FIG. 6 depicts softswitch-based architecture. For example, in a telecommunication network 600 a PSTN/ISDN Emulation Subsystem (PES) 602 may be operatively coupled to a PSTN 618, to other NGNs 620, to application server (AS) 608, to terminals 612, 614 via AGF 610, and to RG 616. The PES 502 may have a service logic control 604, a SGCF & TGCF 606, and AGCF 607.

In the softswitch-based architecture, a Media Gateway Controller (MGC) implementing the PES functional entities along with Access Gateways (AGWs) and Residential Gateways (RGs) are used to replace the existing class 5 local exchanges. The AGWs and RGs support the existing circuit end points and are controlled using H.248/MEGACO. The softswitch controller supporting the PES then provides existing services as well as supporting the introduction of new services through the use of additional Application Servers. To accomplish feature transparency the softswitch controller, and possibly the Application Servers, must be ISUP aware. A Signaling Gateway Control Function (SGCF) provides the interface to the existing PSTN, while signaling to other NGNs uses SIP-I. By doing so, it enables the softswitch controller to continue to provide all the same services in the same manner that the user has come to expect; the user behavior need not change just because the support network has evolved.

FIG. 7 depicts a PSTN/ISDN Simulation Subsystem (PSS). For example, in a telecommunication network 700 a PSTN/ISDN Emulation Subsystem (PES) 702 may be operatively coupled to a PSTN 722, to other SIP networks 720, to terminals 710, 712, and to application server (AS) 714. The PES 702 may have a S-CSCF 704, I-CSCF 706, P-CSCF 708, BGCF 716, and MGCF 718.

The NGN PSS differs from the emulation model described above in that it is strictly an IMS-based architecture used to serve native SIP terminals that are enhanced to provide additional simulation services. The simulation services are simulated versions of the most valuable PSTN supplementary services. However, since it is inappropriate to signal encapsulated ISUP on the UNI to the end-user terminals, new SIP extensions are being introduced to address the gaps. The NNI is also likely to use some of these SIP extensions, but the exact nature of the NNI is still under discussion within the community. There is a desire to maintain full services transparency when interworking with other network types while there is also a desire to avoid promulgating the need to process ISUP messages throughout the network. The resulting NNI profile will have difficulty fully achieving these apparently conflicting goals.

Although instances of the architectures described above use many different SIP profiles, the two main classes of SIP profiles are those that don't use ISUP encapsulation (e.g., IMS SIP) and those that do (e.g., SIP-I and SIP-T). The following are the differences between two SIP profiles that represent each class, IMS SIP and SIP-I. These versions of SIP are referred to as profiles A and C of ITU-T Recommendation Q.1912.5, respectively.

Profile C uses encapsulated ISUP in SIP messages between signaling entities in a trusted domain. The encapsulated ISUP provides for signaling of additional information, including supplementary service information that is not available within SIP. The encapsulated ISUP is marked for mandatory disposition within the SIP messages. A sender of encapsulated ISUP with mandatory disposition assumes that the recipient is able to process and properly respond to any ISUP content not redundant with SIP header information. The receiver of a SIP message with an attachment marked with mandatory disposition is obliged to reject the SIP request if it does not recognized the attachment type. Profile A does not use encapsulated ISUP and is limited to supporting only a subset of the supplementary services as described in Annex B of ITU-T Recommendation Q.1912.5, and of the ones "supported" not all functionality is provided.

Profile C encapsulates two categories of ISUP messages: those that provide information to augment existing SIP session management procedures; and those associated with ISUP procedures that have no SIP counterparts. For example, the ISUP call setup message, the Initial Address Message (IAM), serves to augment information in the SIP INVITE request, while the ISUP message used to obtain the calling party's identity, the Identification Request (IDR) message, is carried in a SIP INFO request since it is not associated with a SIP session management procedure.

Default values exist in profile A for all mandatory ISUP information to be applied when interworking with ISUP since there is no encapsulated ISUP associated with profile A SIP session management procedure messages. Profile A does not use the SIP INFO request for interworking purposes since it does not support ISUP procedures not associated with SIP session management.

Profile C supports signaling of the ISUP Forward and Backward Call Indicators across a SIP network. These indicators provide information related to the nature of the connection. The most significant information passed in these parameters is for echo control, allowing allocation of only the minimum required echo control units. Since a profile A network cannot signal echo control information, it will typically assume that echo suppression is handled locally before reaching the SIP network.

A profile C interworking unit always behaves like a transit exchange, performing cut-through in both directions as soon as possible and providing no call progress tones. A profile A interworking unit may take on some of the characteristics of an originating or destination exchange with respect to cut-through and call progress tones, since it may be directly connected to a SIP UE (user equipment). For example, a profile A Inter-Working Unit (IWU) with SIP on the outgoing side may provide call progress (in-band ringing) based on the receipt of a 180 (Ringing) response to a SIP INVITE request, and a profile A IWU with SIP on the incoming side may perform forward cut-through only upon sending a 200 (OK) response to a SIP INVITE request.

A profile C interworking unit is able to communicate the Suspend and Resume messages used by the Terminal Portability service simply by encapsulating them in a SIP INFO request without affecting the call state or the bearer. However, a profile A endpoint is not able to indicate the event in a non-impacting manner. Since it is desirable to inform the other party of the event, the Terminal Portability events at a profile A interworking unit are represented in a similar manner as Call Hold. The end result is a close approximation, but still not a true representation of the service.

As a result of the differences above, profile C supports signaling for all of the supplementary services while profile A only supports a subset. For those services not supported, profile A must either reject the call, or continue the call with a subset of the capabilities of the service. In the latter case, profile A may perform the service but fail to deliver status information to endpoints, and/or it may fail to perform some portion of the service.

Therefore, there is a need in the art for a system in which different networks may be directly interconnected and be compatible with one another.

SUMMARY

One implementation encompasses an apparatus. This embodiment of the apparatus may comprise: a plurality of networks operatively coupled to one another, and having respective end points; and a single SIP profile useable by each network of the plurality of networks; wherein two end points, via signaling mechanisms within SIP, negotiate a level of support for ISUP services that are usable between the two end points.

One implementation encompasses a method. This embodiment of the method may comprise: negotiating by two endpoints, via signaling mechanisms within SIP, a level of support for ISUP services that are usable between the two endpoints.

DESCRIPTION OF THE DRAWINGS

Features of exemplary implementations will become apparent from the description, the claims, and the accompanying drawings in which:

DETAILED DESCRIPTION

The telephony network is evolving to an all Internet Protocol (IP) based network. The $3^{rd}$ Generation Partnership Project (3GPP) and 3GPP2 standards organizations are currently defining the network architecture for the next generation IP Multimedia Subsystem (IMS) network, which is being applied to multiple access technologies and networks, including the Next Generation Network (NGN). Concurrently, an effort lead by ITU-T SG 13 and presently carried in the Focus Group on NGN (FGNGN) is adopting IMS for wireline networks. The European Telecommunications Standards Institute (ETSI) Telecommunication and Internet converged Services and Protocols for Advanced Networks (TISPAN) is also developing NGN specifications. An essential part of the NGN is the seamless interaction with the existing telephony network, enabled by interworking between Integrated Services Digital Network User Part (ISUP) in the PSTN and Session Initiation Protocol (SIP) in the IMS. Several SIP profiles have been defined in the Internet Engineering Task Force (IETF) and the International Telecommunications Union-Telecommunication sector (ITU-T) for specific interworking applications. SIP is a very flexible protocol with numerous options and extensions. A SIP profile is a specific combination of options and extensions as used by an application. No existing profile currently supports the interworking of all existing services between SIP networks.

In general, embodiments of the present method and apparatus provide procedures using existing signaling mechanisms within SIP to allow two nodes to negotiate the level of support for ISUP services that may be used between them.

When initiating a request to a far SIP endpoint, new procedures are provided to determine when either the far endpoint is required to accept the encapsulated ISUP or it is allowed to ignore the encapsulated ISUP. The required or optional support of the encapsulated ISUP is signaled using an existing SIP mechanism. If the far SIP endpoint does not recognize the encapsulated ISUP when marked as required, it will reject the request using existing SIP procedures. When the initiating endpoint receive the rejection, new procedures are defined to determine how to further handle the request.

The new procedure also accommodates the ability to selectively support only those portions of the ISUP information that is pertinent to the supported services. With the existing art, either the full ISUP must be supported or none of it.

Figure 1:
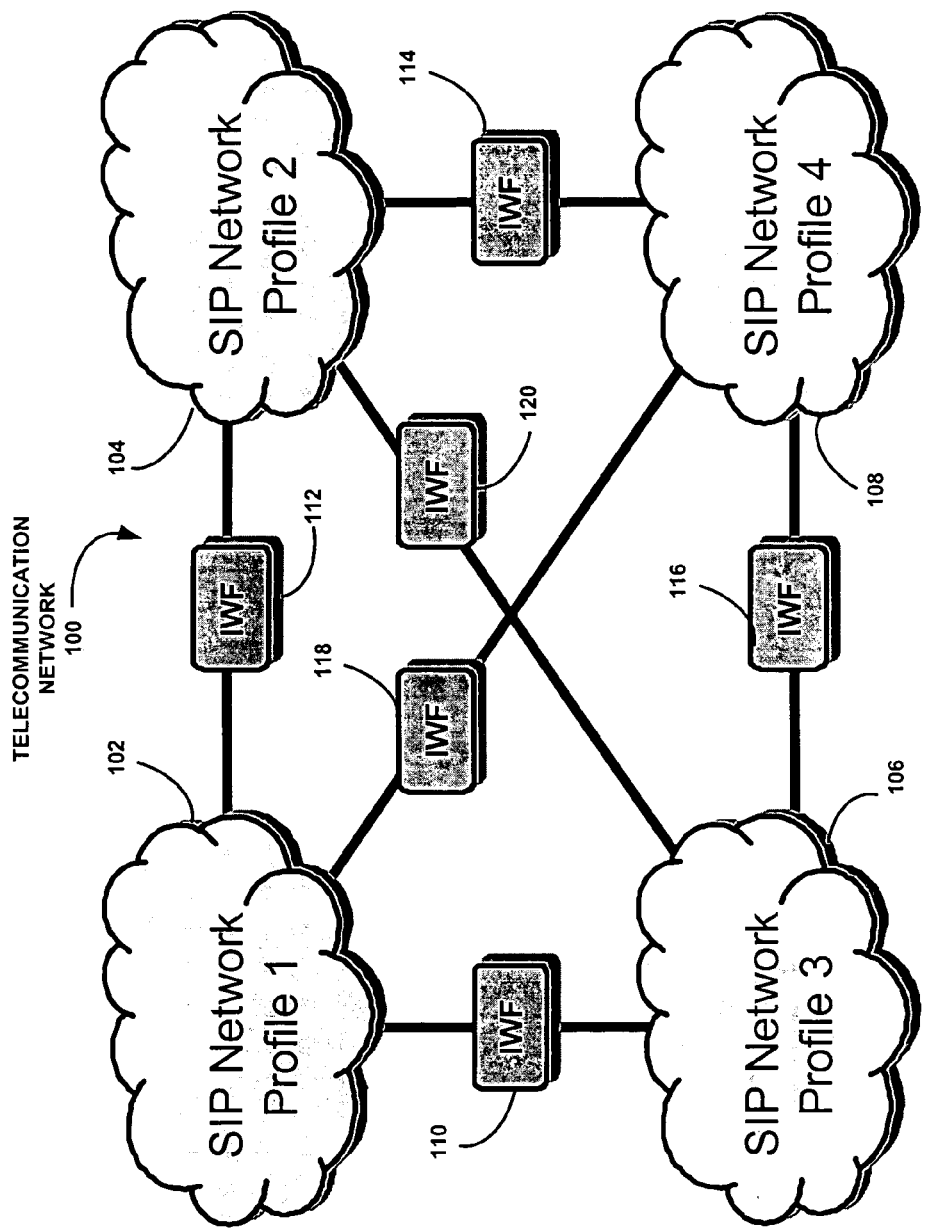
FIG. 1 is a prior art telecommunication network having different interconnected networks.
Figure 2:
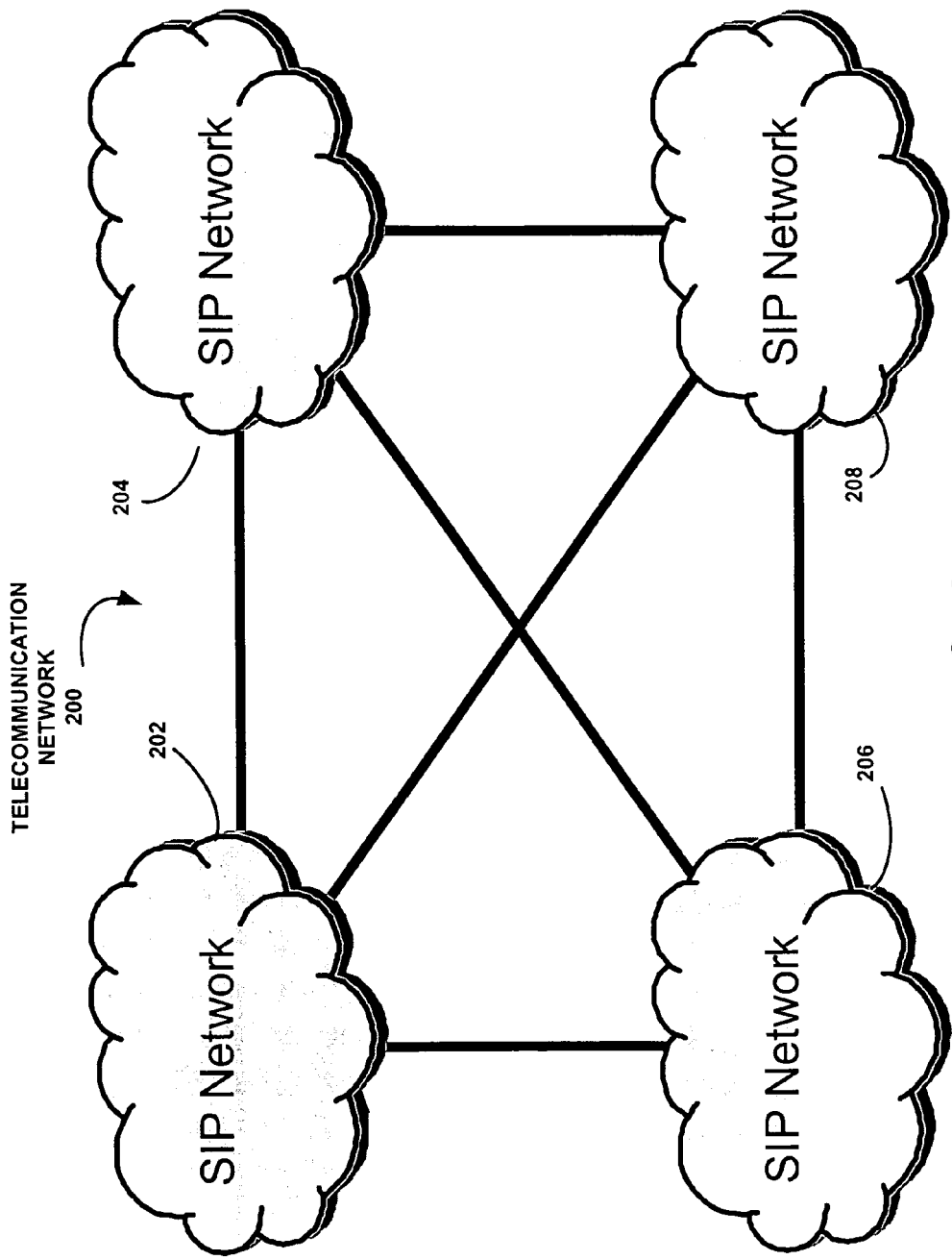
FIG. 2 is an embodiment in a telecommunication network according to the present method and apparatus.
Figure 3:
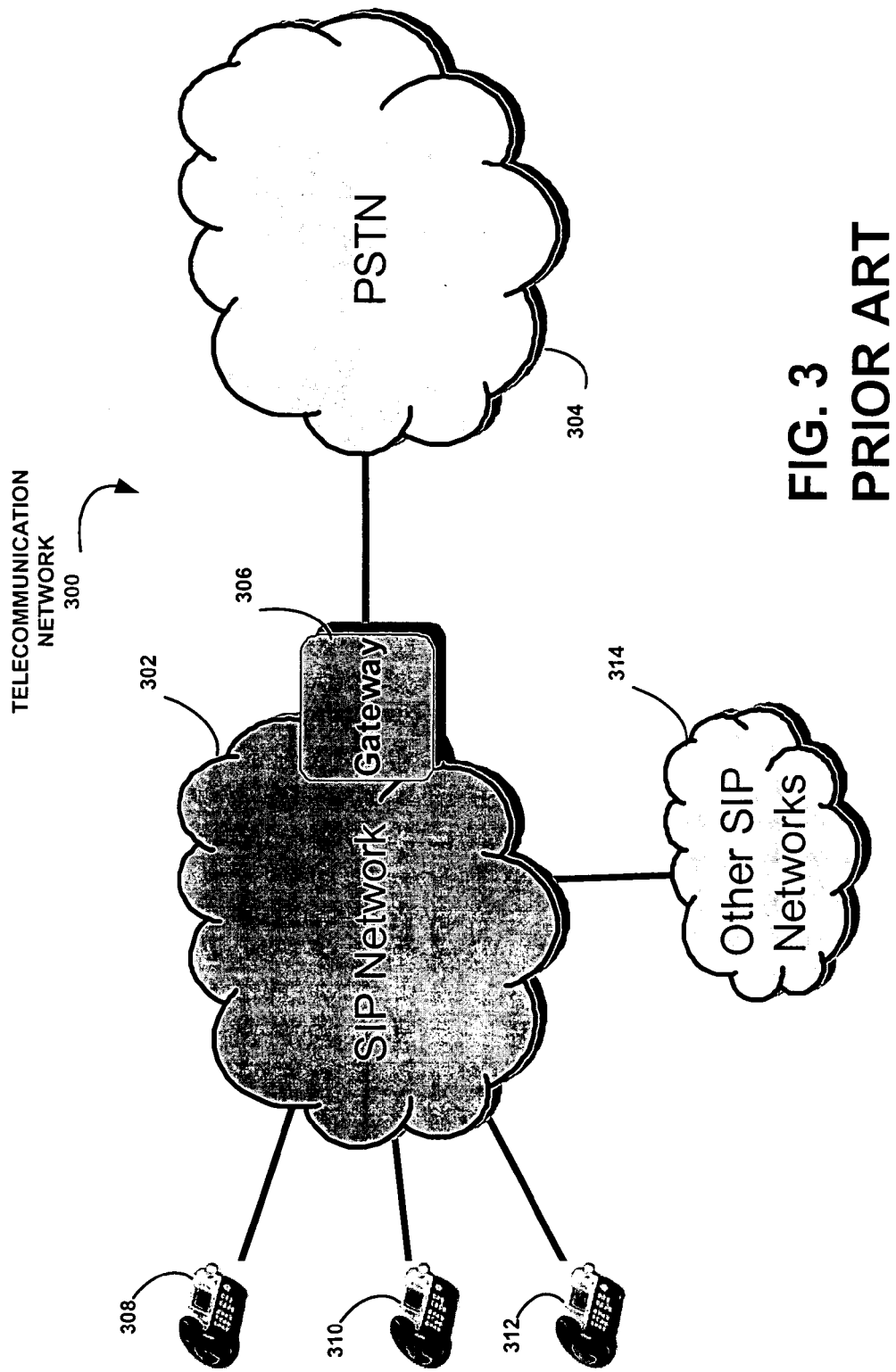
FIG. 3 is a prior art telecommunication network that depicts end-to-end native SIP networks.
Figure 4:
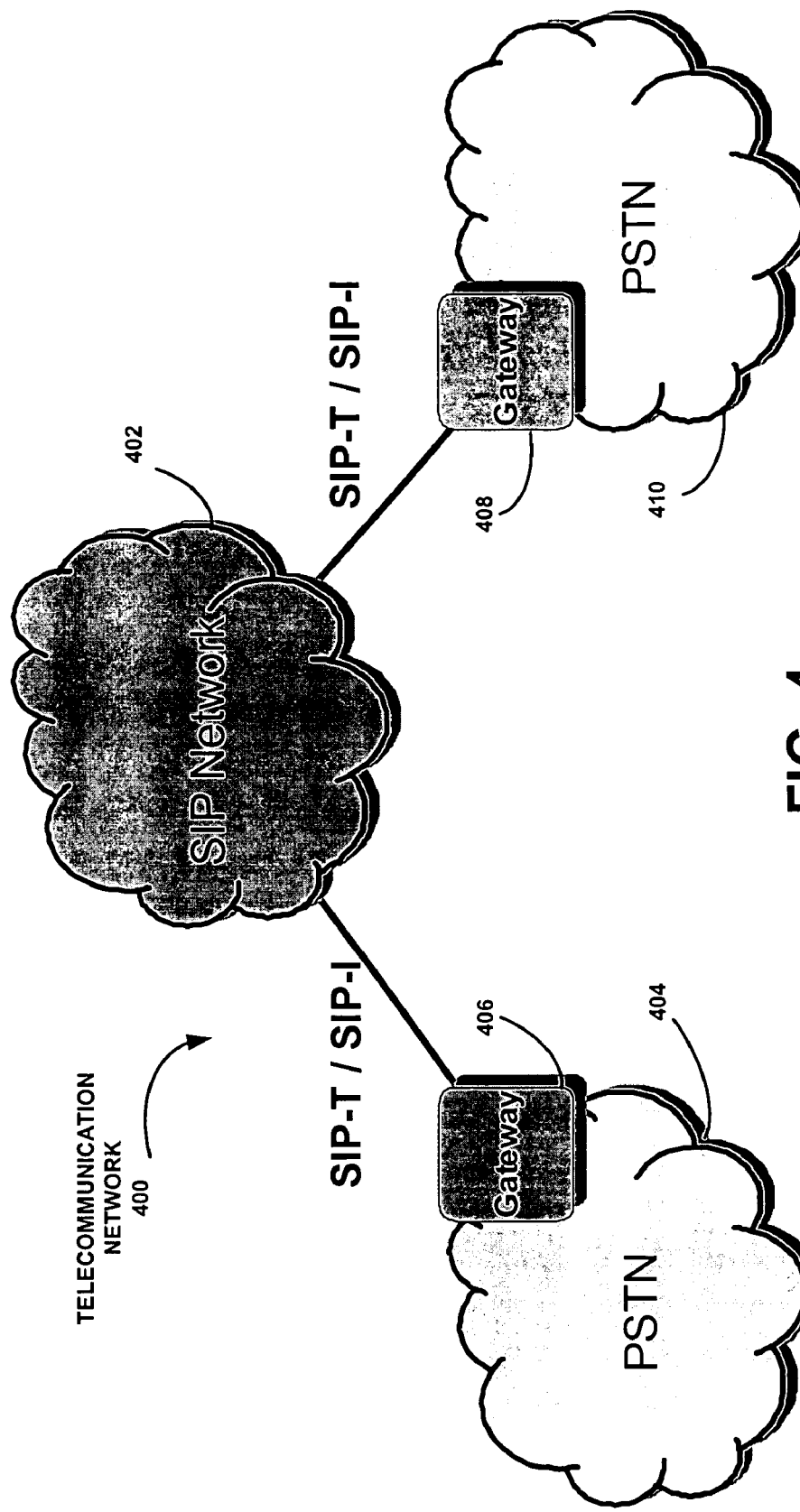
FIG. 4 is a prior art telecommunication network that depicts networks that bridge ISUP networks.
Figure 5:
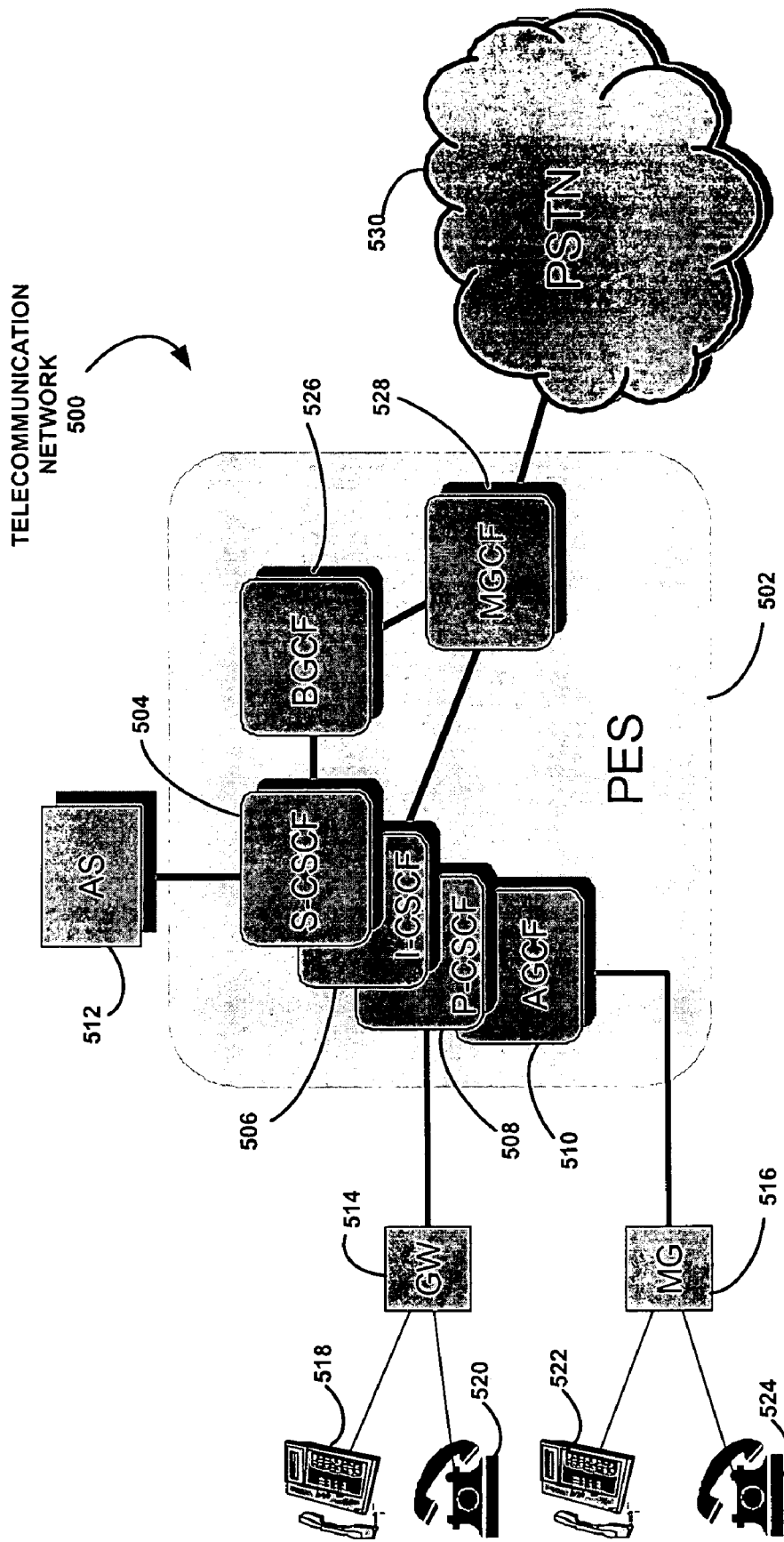
FIG. 5 is a prior art telecommunication network that depicts an IMS based PSTN/ISDN Emulation Subsystem (PES)
Figure 6:
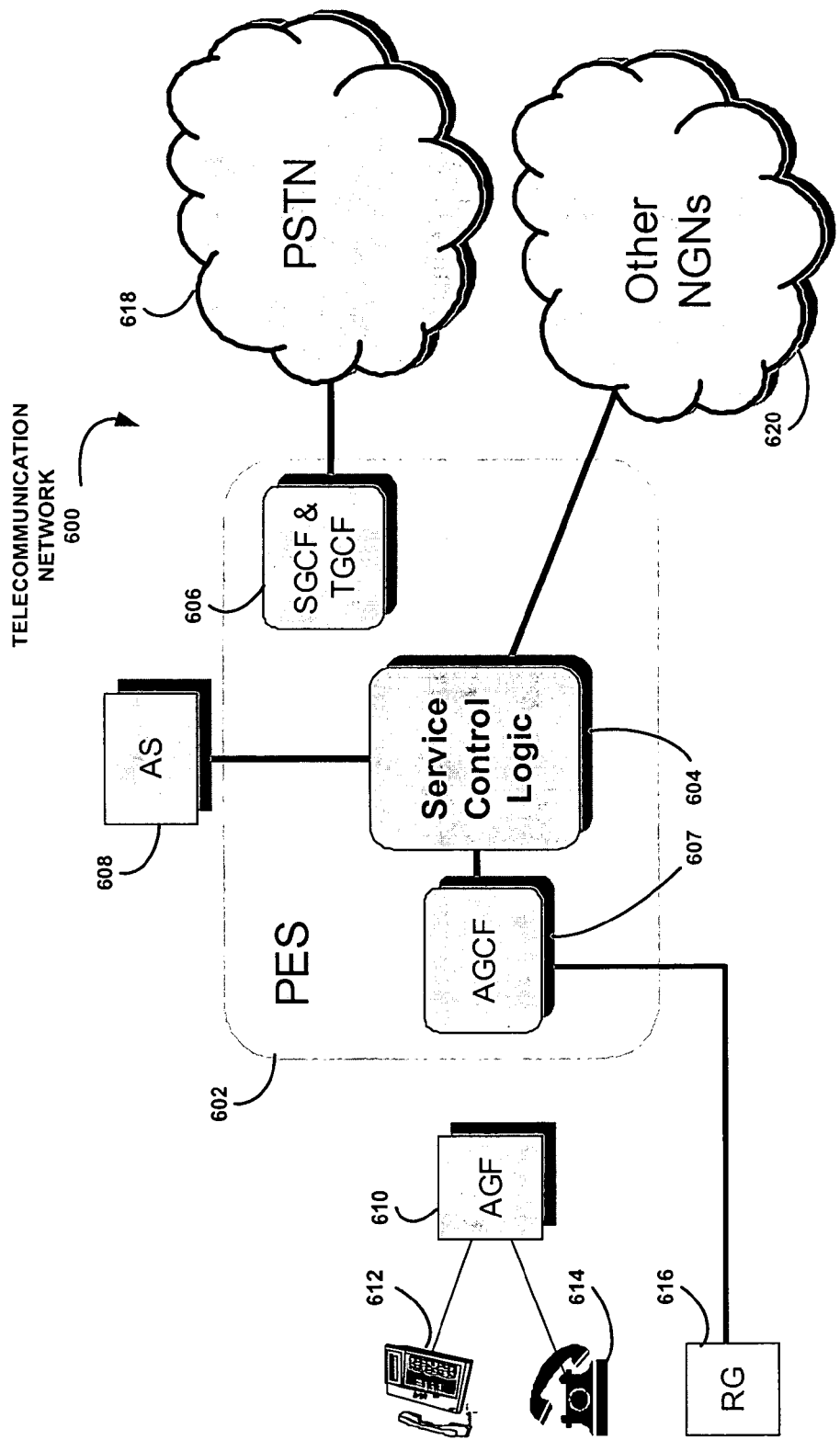
FIG. 6 is a prior art telecommunication network that depicts NGN softswitch-based architecture.
Figure 7:
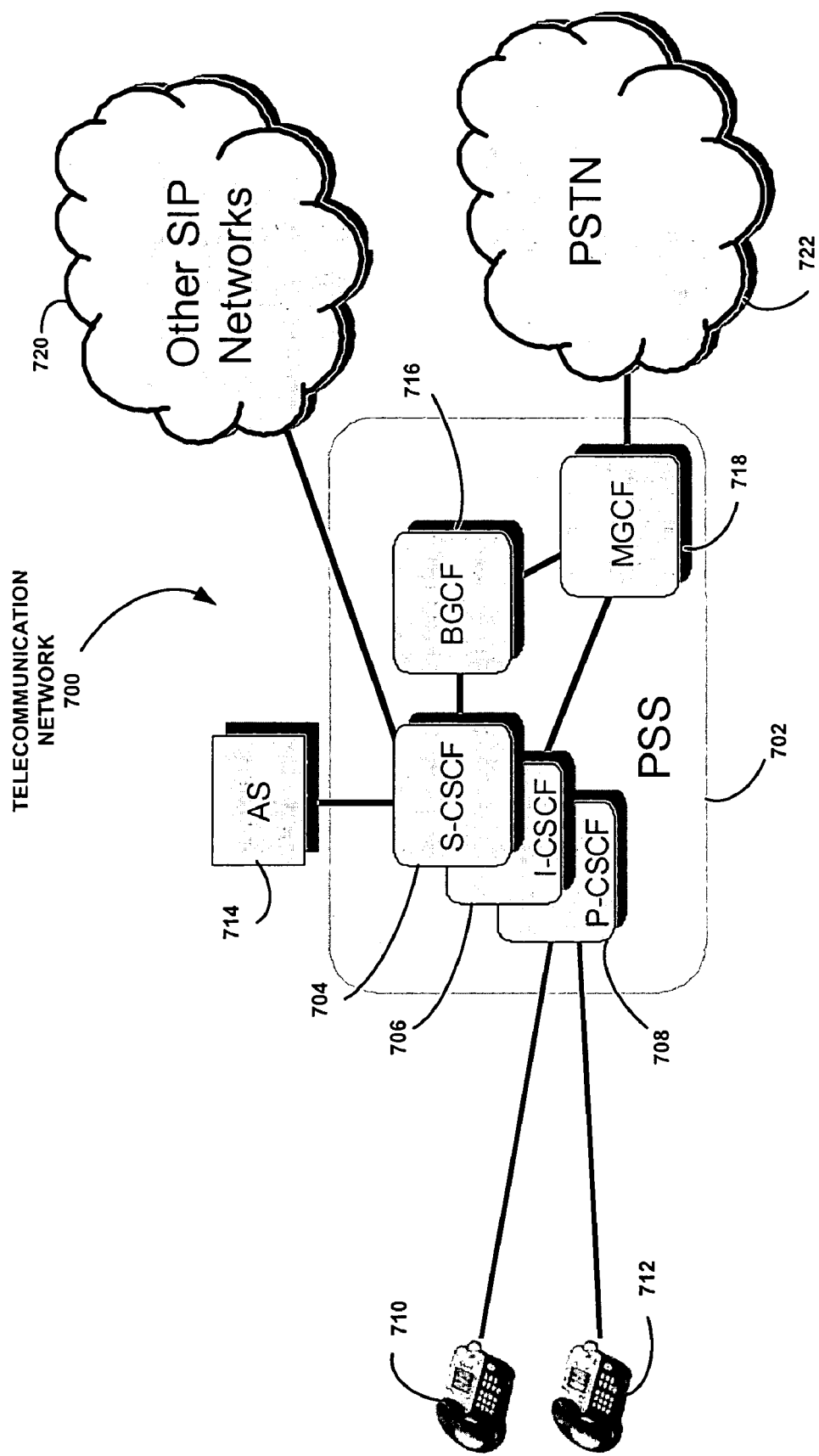
FIG. 7 is a prior art telecommunication network that depicts a PSTN/ISDN Simulation Subsystem (PSS).

As depicted in FIG. 2, embodiments of the present apparatus and method provide a telecommunication network 200 in which SIP networks 202, 204, 206, 208 may be directly interconnected and compatible with one another, and able to negotiate any differences in the use of SIP extensions to maximize feature transparency at the minimum cost in network resources. These embodiments have become more important as various groups have begun to design the wireline Next Generation Networks (NGN) based on the use of SIP. The support of existing PSTN supplementary services is a key issue for NGN, in many cases requiring either the full translation or encapsulation of ISUP information throughout the networks. Embodiments of the present apparatus and method may maintain a maximum possible service transparency throughout interconnected networks that have different degrees of support for PSTN services and encapsulated ISUP, while minimizing the need for specialized interworking gateways between the networks.

The following describes requirements of a common SIP profile.

To provide a single NNI SIP profile for all of these architectures, the SIP profile should ideally be enhanced to allow interworking between various endpoints with the option to signal full PSTN supplementary service information between different combinations of SIP endpoints. This same functionality could be accomplished by supporting two different profiles within IMS: one profile between one set of SIP endpoints (perhaps SIP Profile C), and a second profile between different set of SIP endpoints (perhaps SIP Profile A). This approach has the significant drawback that a potentially additional SIP endpoint must be included whenever signaling between ISUP-aware and non-ISUP-aware endpoints to perform this conversion. While it may be the case that such a SIP endpoint will always be present for some network configurations, it is not true for all networks or call scenarios. Since downstream SIP endpoints may implement services unknown to the originating endpoint of a SIP request, such as call forwarding, the originating endpoint cannot know in advance if the terminating endpoint will be in the same trust domain and cannot know in advance if the terminating endpoint is capable of supporting encapsulated ISUP information.

SIP endpoints must be able to interoperate whether or not they can decode, recognize, or generate encapsulated ISUP. Therefore, encapsulated ISUP should be marked with optional disposition to allow calls to proceed normally when the ISUP cannot be decoded or recognized by a receiver and the information is not critical to the call. Some exceptions are noted later in the paper.

The following describes ISUP augmenting SIP session management.

For most basic calls, the information available in encapsulated ISUP (profile C) is redundant with the information available in the SIP headers. In this case, any processing of encapsulated ISUP is unnecessary for any endpoint.

Information available in the encapsulated ISUP associated with SIP session control messages can be categorized as follows:

Category 1: Information redundant with SIP headers, with acceptable default values and handling provided, or where non-essential feature control or reporting information is not available in SIP headers and where the call can continue, but may lack optional service capability such the ability to report service status information. An example of such a service is Call Forwarding where Call Progress (CPG) messages are sent to provide information about the forwarding action.

Category 2: Non-essential feature control information may not available in SIP headers, where the call can continue without processing of the information, but the related service cannot be provided. An example of such a service is Reverse Charging where the call can be continued without the changing being applied to the calling party.

Category 3: Essential feature control information may not be available in SIP headers, where the call cannot continue unless the information is correctly processed. The essential user-to-user service is an example in this category.

Feature control information may span more than one of these categories. The correct behavior when unable to communicate supplementary services information in such categories may be identified from the "interworking with other networks" clauses of the affected supplementary services specifications.

It must be possible to identify situations in which feature control information included in encapsulated ISUP associated with SIP session management procedures is essential to the nature of the call and to assure that the call is properly handled (e.g., released) if the feature control information cannot be communicated between peer SIP signaling entities.

After reviewing the impact of SIP profile A on various services, it appears that the requirement to release a call when unable to communicate certain essential ISUP information is unique to the ISUP IAM encapsulated within a SIP INVITE request. In this case, by marking the encapsulated ISUP IAM with mandatory disposition, it assures that an endpoint receiving the INVITE request that is incapable of processing the encapsulated IAM will reject the INVITE request with a 415 (Unsupported Media Type) response.

The following describes ISUP procedures unrelated to SIP.

Clause 5.4.3 of ITU-T Recommendation Q.1912.5 identifies certain ISUP messages for special treatment since they are unrelated to SIP session management procedures. Those that are local to the ISUP interface for which no interworking procedures are defined can be safely ignored. Clause 5.4.3.2, however, describes the procedures for transparent transport of certain messages in either the first 183 (Session Progress) provisional response to a SIP INVITE request or in the SIP INFO request. The ISUP User to ser information message (USR), Suspend (SUS) and Resume (RES) messages are examples of messages within this category.

The information carried by these ISUP messages supports various services. This information can be characterized by the same categories 1-3 defined above.

It must be possible to identify when a peer SIP signaling entity is unable to process ISUP information not associated with SIP session management procedures and back off to the corresponding procedures defined for interworking with other networks. Since it is not possible to reject a 183 (Session Progress) response to an INVITE request, these ISUP messages with category 2 information must only be carried in SIP INFO requests. ISUP messages with only category 1 information encapsulated in an INFO request can always safely be marked with optional disposition or not be sent. On the other hand, ISUP messages with category 2 information encapsulated in an INFO request should be marked with mandatory disposition. This assures that an endpoint receiving the INFO request that is incapable of processing the encapsulated ISUP message will reject the INFO request with a 415 (Unsupported Media Type) response, without affecting the corresponding call. When initiating an ISUP procedure with a peer SIP signaling entity by transparently signaling the ISUP message in a SIP INFO request, an IWU that knows or discovers (by receiving an SIP Accept header indicating support for ISUP encapsulation or a 415 response to the INFO request) that its peer SIP signaling entity does not support encapsulated ISUP will back off to the corresponding procedures defined for interworking the service with other (non-ISDN) networks. In ITU-T Recommendation Q.1912.5, profile C procedures apply when ISUP signaling is supported between SIP peers, and profile A procedures apply when ISUP signaling is not available between SIP peers and the IWU backs off to the procedures defined for interworking with other networks.

Figure 8:
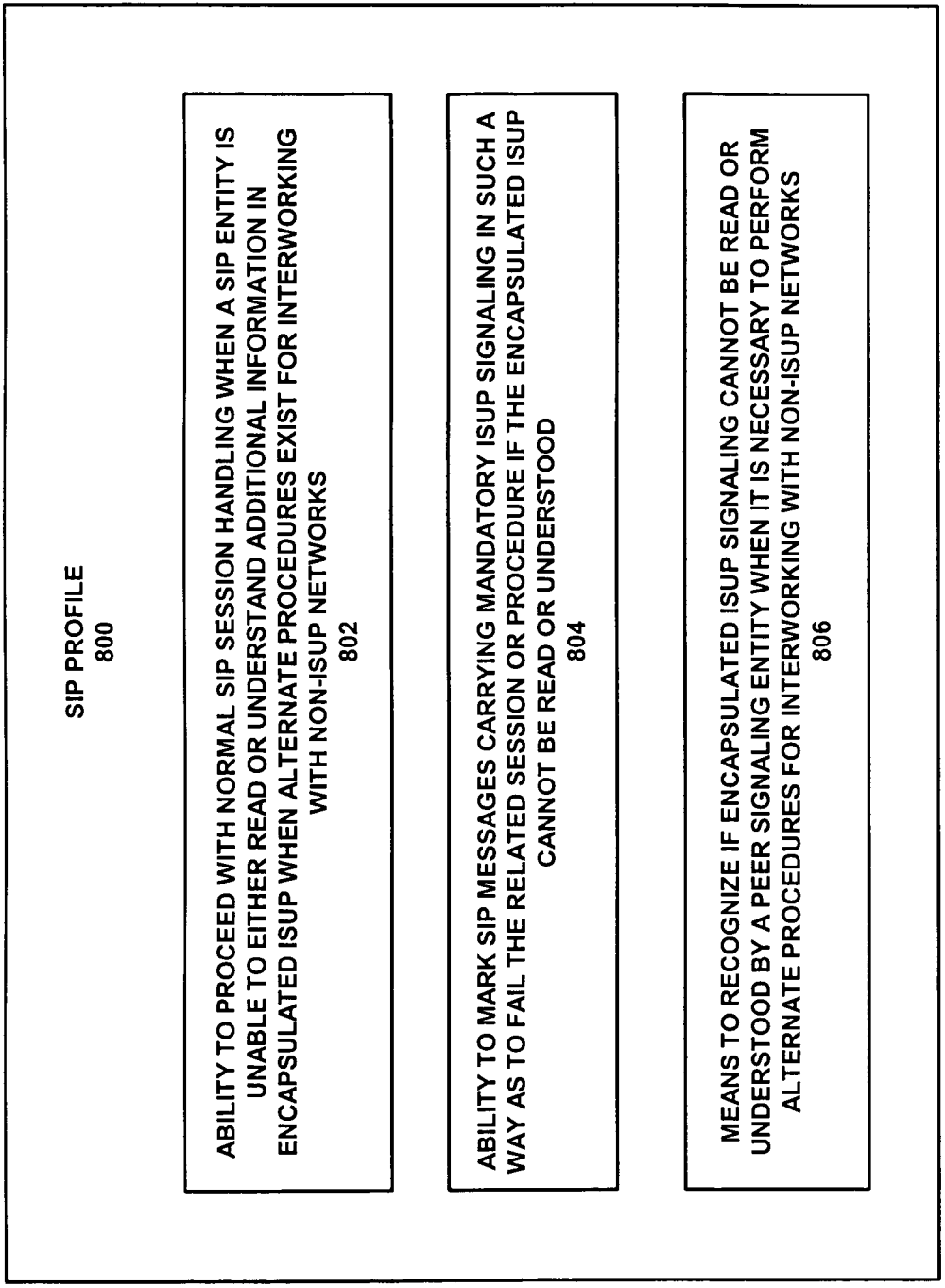
FIG. 8 is an embodiment of a SIP profile according to the present method and apparatus.

As the communications industry harnesses the power of SIP to evolve existing wireline and wireless networks into the next generation networks of the future, there is a danger that the need to continue to offer the many services available in the ISUP-based PSTN today within the SIP-based networks of the future will continue to drive a wedge between SIP bridging networks using ISUP encapsulation and SIP networks serving SIP terminals without ISUP encapsulation. However, using the embodiments of the present method and apparatus there is no technical reason why these two classes of SIP networks cannot be served by a single SIP profile with the ability to dynamically adapt to the needs of the peer signaling entities. IMS, PES, PSS and other SIP networks may use a single SIP profile developed using the simple concepts described herein while minimizing or eliminating the need for special interworking units between the networks. As depicted in FIG. 8, this new SIP profile 800 may have the following characteristics:

1) The ability to proceed with normal SIP session handling when a SIP entity is unable to either read or understand additional information in encapsulated ISUP when alternate procedures exist for interworking with non-ISUP networks 802.

2) The ability to mark SIP messages carrying mandatory ISUP signaling in such a way as to fail the related session or procedure if the encapsulated ISUP cannot be read or understood 804.

3) A means to recognize if encapsulated ISUP signaling cannot be read or understood by a peer signaling entity when it is necessary to perform alternate procedures for interworking with non-ISUP networks 806.

As the IETF develops SIP services analogous to the PSTN supplementary services for which ISUP encapsulation continues to appear necessary, SIP headers and non-ISUP attachments will provide more and more of the necessary signaling needed to support these simulation services. This process has already begun in earnest with the ongoing development of the PSS for NGN. It is likely that SIP will soon provide the signaling mechanisms needed to support services similar to the most common ones available in the PSTN today. But SIP will never provide a substitute for all possible ISUP signaling situations. There are many national and operator-specific features dependent on ISUP that may never see analogues within SIP. Embodiments of the present method and apparatus provide a new SIP profile that allows peer signaling entities to dynamically adapt to different levels of support for auxiliary ISUP procedures as a key contributor to the evolution of the existing wireline and wireless telephony networks to the next generation.

The following is a more specific description of embodiments according to the present method and apparatus.

In order to interwork the ISUP into SIP specific parameters, some knowledge of the individual services may be required, as it is not possible to achieve a totally transparent mapping between ISUP parameters and SIP specific parameters. Whenever possible, ISUP information should be mapped into available SIP headers, but when a fully transparent mapping is not possible, the use of ISUP encapsulation may be required to support the service. When using encapsulated ISUP in support of a service, a SIP endpoint only needs to support generic capabilities, making it straightforward to support existing PSTN services until and unless equivalent SIP mechanisms are available.

Embodiments of the present method and apparatus may have the following features. SIP networks may support optional transport of ISUP information within SIP messages using existing SIP mechanisms if possible, or with additions that require only IANA registration based on external specifications. It is possible to realize SIP endpoints that are capable of supporting selected subsets of ISUP procedures associated with ISUP information within SIP messages. The supported subsets may include at least those needed for existing ISUP supplementary services. A SIP PSTN Gateway (e.g, IMS MGCF) is capable of interworking between SIP networks and PSTN/ISDN using ISUP information within SIP messages as needed for one of the supported subsets of ISUP procedures.

The information in SIP headers takes precedence over any corresponding information present in encapsulated ISUP. With embodiments of the present method and apparatus it is possible to identify situations in which feature control information is included in encapsulated ISUP associated with SIP session management procedures and assure that the call is properly handled (e.g., proceed or release) if the feature control information cannot be communicated between peer SIP signaling entities. Proper handling is determined by the procedures for "interworking with other networks" for the impacted service specification. Also, it is possible to identify when a peer SIP signaling entity is unable to process ISUP information not associated with SIP session management procedures and back off to the corresponding procedures defined for interworking with other networks.

The ISUP encapsulation procedures described below allow an SIP endpoint to discover whether or not its peer SIP signaling entity (i.e. the next UA along the signaling path, which may be a SIP back-to-back user agent (B2BUA), and therefore excluding any intermediate proxies) is capable of supporting encapsulated ISUP information within SIP messages, and to dynamically adapt to different levels of support for ISUP procedures.

Embodiments of the present method and apparatus provide mapping between ISUP parameters and SIP headers for determining when to create ISUP messages for encapsulation in support of various ISUP procedures and services. The SIP endpoint selectively supports those ISUP procedures associated with supported ISUP services.

After the initial SIP INVITE request, the SIP endpoint may only send encapsulated ISUP to a peer SIP signaling entity that has indicated support for encapsulated ISUP within the current dialog.

When the following conditions are satisfied, the SIP endpoint may send an encapsulated ISUP message in the appropriate SIP message to a peer SIP signaling entity:

The SIP endpoint is capable of performing service related signaling using ISUP for one or more of the services it supports.

Either the encapsulating message is the initial SIP INVITE request, or the peer SIP signaling entity has previously indicated support for encapsulated ISUP within the associated dialog.

An ISUP event occurs requiring signaling to the peer SIP signaling entity. This event may be the receipt of an encapsulated ISUP message from another SIP interface to the SIP endpoint, an event received on an ISUP interface of the SIP endpoint, or an ISUP event internal to the SIP endpoint for a supported ISUP procedure.

The candidate ISUP message contains ISUP information that is different from defined default values for the associated parameters, or that has not been successfully mapped to equivalent SIP headers in the encapsulating message according to the standard procedures.

When these conditions are satisfied, the SIP endpoint encapsulates the ISUP message within the appropriate SIP message. In particular, the SIP endpoint does not include encapsulated ISUP if all the ISUP information in the candidate ISUP message is successfully defaulted or mapped into SIP headers.

When constructing an initial INVITE request, an originating SIP endpoint that supports any ISUP procedures may include an indication of support for encapsulated ISUP either by including an Accept header in the INVITE request that indicates support for encapsulated ISUP and/or an encapsulated ISUP IAM. Until and unless the originating SIP endpoint receives indication of support for encapsulated ISUP from its peer SIP signaling entity (by receipt of a SIP message that either includes an Accept header indicating support for encapsulated ISUP or an encapsulated ISUP message), the originating SIP endpoint may not encapsulate any further ISUP messages within the dialog. If the originating SIP endpoint receives indication of support for encapsulated ISUP from its peer SIP signaling entity during a dialog, the originating SIP endpoint may follow the ISUP encapsulation procedures within this specification for the remainder of the dialog.

If a terminating SIP endpoint receives an initial INVITE request that includes neither an Accept header indicating support for encapsulated ISUP nor an encapsulated ISUP message, the terminating SIP endpoint may not encapsulate any ISUP messages within the dialog. If a terminating SIP endpoint supporting any ISUP procedures receives an initial INVITE request that includes either an Accept header indicating support for encapsulated ISUP or an encapsulated ISUP IAM, the terminating SIP endpoint may follow the ISUP encapsulation procedures within this specification for the remainder of the dialog. A terminating SIP endpoint not supporting any ISUP encapsulation procedures may follow procedures as described below.

If a supported ISUP procedure in the SIP endpoint requires the communication of addition ISUP information associated with basic SIP call control procedures, then the SIP endpoint may encapsulate the appropriate ISUP message in the corresponding SIP message.

The following is a determination of content handling according to the embodiments of the present method and apparatus.

An originating SIP endpoint sending an initial INVITE request with an encapsulated IAM may mark it for required handling in the following cases:

If the ISUP preference indicator is set to "ISUP required all the way".

If the parameter compatibility parameter associated with any parameter indicates "release call" or "discard message" when pass on is not possible.

As a matter of local policy when a critical ISUP parameter value is not successfully mapped to a SIP header.

Otherwise the originating SIP endpoint may mark the encapsulated IAM in an initial INVITE request for optional handling.

If the peer SIP signaling entity is unable to process an IAM marked for required handling it may reject the INVITE request with a failure response, allowing the originating SIP endpoint, or a proxy on the path, to optionally retry the request to an alternate destination that may be capable of handling the ISUP information.

An SIP endpoint encapsulating an ISUP message in a SIP INFO request may mark it for required handling. If the peer SIP signaling entity rejects an ISUP message in an INFO request by returning a failure response, the SIP endpoint performs the ISUP procedure that is applicable when interworking with other networks, if one exists, and continues the call associated with the parent dialog. The SIP endpoint may release the call if there is any ISUP information in the INFO request that requires call release if it cannot be processed or forwarded.

An SIP endpoint encapsulating an ISUP message in any other SIP message may mark it for optional handling.

Embodiments of the present method and apparatus are base on the following concepts. The SIP endpoint will reject a SIP request that includes ISUP MIME in an unsupported format marked for required handling with a SIP 415 (Unsupported Media Type) response.

The SIP endpoint will reject a SIP request that includes ISUP MIME in an undecodable format marked for required handling with a SIP 493 (Undecipherable) response.

The SIP endpoint will ignore ISUP MIME in an unsupported or undecodable format marked for optional handling in any SIP request or response.

Upon receipt of any SIP message without encapsulated ISUP while supporting ISUP procedures, the SIP endpoint may continue the applicable SIP and ISUP procedures according to this specification. If necessary, the SIP endpoint may assume default values for ISUP parameters and the relevant ISUP specifications.

On receipt of a SIP message containing encapsulated ISUP, an SIP endpoint supporting ISUP procedures may de-encapsulate the ISUP message from the SIP message body and perform the processing as described in the following.

Embodiments of the present method and apparatus provide that a terminating SIP endpoint may reject with a SIP 603 (Decline) response an initial SIP INVITE request that includes ISUP MIME that is in a supported and decodable format, that is marked for required handling, and that includes ISUP information that the SIP endpoint does not support and that requires release according to ISUP procedures when unsupported.

An SIP endpoint may reject with a 603 (Decline) response to an INFO request that includes ISUP MIME that is in a supported and decodable format, that is marked for required handling, and that includes ISUP information that the SIP endpoint does not support and that requires release according to ISUP procedures when unsupported.

When a SIP endpoint receives an INFO request that includes ISUP MIME that is in a supported and decodable format, that is marked for required handling, and that includes ISUP information that the SIP endpoint does not support, where none of the unsupported ISUP information requires release according to ISUP procedures when unsupported, the SIP endpoint may reject the INFO request with a 603 (Decline) response, invoke the ISUP procedures appropriate for the unsupported ISUP information (e.g., return an encapsulated ISUP Confusion message), or ignore the unsupported ISUP information.

The SIP endpoint may ignore any unsupported ISUP information it receives in an ISUP MIME marked for optional handling in any SIP request or response.

Regarding alignment of headers and ISUP body contents, on receipt of a SIP message containing encapsulated ISUP, the SIP endpoint may use known procedures to align any parameters in the ISUP message that are in conflict with SEP header fields (e.g. due to service invocation within the SIP network), as needed for the supported ISUP procedures.

The default value for an ISUP parameter or the relevant ISUP recommendation may be used in the absence of encapsulated ISUP information, if necessary.

Where a SIP header mapping to ISUP field(s) is defined, then the SIP header is given precedence over the encapsulated ISUP value in the alignment process. As a network option, an IMS may choose to give precedence to the encapsulated ISUP value for any other parameter for which the mapping to the corresponding SIP header is incomplete.

Regarding executing the ISUP procedures, the SIP endpoint may use the ISUP information to perform the relevant ISUP procedures for the supported ISUP services.

Table 1 describes the handling of ISUP messages not associated with SIP session management procedures that may be either received by the SIP endpoint, or transmitted by the SIP endpoint as required by a supported ISUP procedure. The ISUP messages listed in the table are either not encapsulated within any SIP message or receive a special treatment with regards to ISUP encapsulation. This table shows only those messages within ITU-T Recommendation Q.763 that are not marked "national use".

TABLE 1

ISUP messages for special consideration
ISUP message

Reset Circuit (Note 1)
Call Progress (Note 2)
Circuit Group Blocking (Note 1)
Circuit Group Blocking Acknowledgement (Note 1)
Group Reset (Note 1)
Circuit Group Reset Acknowledgement (Note 1)
Confusion (Note 2)
Facility Reject (Note 2)
User to User information (Note 2)
Forward Transfer (Note 2)
Suspend (Note 2)
Resume (Note 2)
Blocking (Note 1)
Blocking Acknowledgement (Note 1)
Continuity Check Request (Note 1)
Continuity (Note 1)
Unblocking (Note 1)
Unblocking Acknowledgement (Note 1)
Circuit Group Unblocking (Note 1)
Circuit Group Unblocking Acknowledgement (Note 1)
Facility Accepted (Note 2)
Facility Request (Note 2)
User Part Test (Note 1)
User Part Available (Note 1)
Facility (Note 2)
Network Resource Management (Note 2)
Identification Request (Note 2)
Identification Response (Note 2)
Segmentation (Note 1)
Loop Prevention (Note 2)
Application Transport (Note 2)
Pre-Release Information (Note 2)
Release Complete (Note 1)

Note 1: Unsupported ISUP procedures.
Note 2: Transparent messages

Regarding unsupported ISUP procedures, these messages may not be encapsulated within SIP messages transmitted by the AS. Most of these messages are related to maintenance of ISUP circuits and not applicable to a SIP network. If these ISUP messages are received encapsulated within SIP messages, the ISUP information may be discarded.

Regarding transparent message, when ISUP encapsulation procedures are applicable and an ISUP event occurs for a supported ISUP procedure that requires transmission of one of these messages, the AS may send the ISUP message through the SIP network encapsulated in the INFO request, with the one exception described below. These ISUP messages maintain end-to-end service transparency.

If an originating SIP endpoint has not yet received a reliable provisional or final response within the dialog when the INFO request is ready to be sent, it may wait to receive a reliable provisional or final response before sending the INFO request.

If a terminating SIP endpoint has not yet sent a reliable provisional or final response to establish the dialog when the INFO request is ready to be sent, it should send and receive acknowledgment for a 183 (Session Progress) reliable provisional response before sending the INFO request. As an exception to the usual encapsulation of the ISUP message in an INFO request, if the ISUP message to be encapsulated by a terminating AS requires no ISUP response and can be safely ignored by the intended recipient, the terminating SIP endpoint may alternately encapsulate the ISUP message in a 183 (Session Progress) reliable provisional response marked for optional handling.

If a terminating SIP endpoint has not yet received acknowledgment for a reliable provisional or final response within the dialog when the INFO request is ready to be sent, it may wait for the acknowledgment before sending the INFO request.

Thus the embodiments of the present method and apparatus overcome the drawbacks of the prior art by providing a SIP profile that may be used between SIP nodes to dynamically adapt to accommodate differences between levels of support of SIP when passing encapsulated ISUP information.

The present apparatus in one example may comprise a plurality of components such as one or more of electronic components, hardware components, and computer software components. A number of such components may be combined or divided in the apparatus.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising:
using a single SIP profile for SIP bridging networks using ISUP encapsulation and SIP networks serving SIP terminals without ISUP encapsulation;
negotiating by two endpoints, via signaling mechanisms within SIP (Session Initiation Protocol) via the single SIP profile, a level of support for ISUP (Integrated Services Digital Network User Part) services which are usable between the two endpoints; and
selectively supporting only those portions of ISUP information that are pertinent to supported ISUP services.

2. The method according to claim 1, wherein the method further comprises SIP endpoints conformant to the SIP profile interoperate irrespective of one of decoding, recognizing, and generating encapsulated ISUP.

3. The method according to claim 1, wherein the method further comprises identifying situations in which feature control information is included in encapsulated ISUP associated with SIP session management procedures and assuring that a call is properly handled if the feature control information cannot be communicated between peer SIP signaling entities.

4. The method according to claim 1, wherein the method further comprises identifying when a peer SIP signaling entity is unable to process ISUP information not associated with SIP session management procedures and backing off to corresponding procedures for interworking with other networks.

5. The method according to claim 1, wherein the method further comprises allowing a SIP endpoint to discover if a peer SIP signaling entity is capable of supporting encapsulated ISUP information within SIP messages, and dynamically adapting to different levels of support for ISUP procedures.

6. The method according to claim 1, wherein the method further comprises the SIP endpoint selectively supporting ISUP procedures associated with supported ISUP services.

7. The method according to claim 6, wherein, after an initial SIP INVITE request, the SIP endpoint only sending encapsulated ISUP to a peer SIP signaling entity that has indicated support for encapsulated ISUP within a current dialog.

8. The method according to claim 1, wherein the SIP endpoint sends an encapsulated ISUP message in a predetermined SIP message to a peer SIP signaling entity, when:
the SIP endpoint is capable of performing service related signaling using ISUP for at least one of services that the SIP endpoint supports;
either the encapsulated ISUP message is the initial SIP INVITE request, or the peer SIP signaling entity has previously indicated support for encapsulated ISUP within an associated dialog;
an ISUP event occurs requiring signaling to a peer SIP signaling entity, which event is one of receipt of an encapsulated ISUP message from another SIP interface to the SIP endpoint, and an ISUP event internal to the SIP endpoint for a supported ISUP procedure; and
a candidate ISUP message is one of contains ISUP information that is different from default values for associated parameters, and has not been successfully mapped to equivalent SIP headers in the encapsulated ISUP message.

9. The method according to claim 8, wherein the SIP endpoint excludes encapsulated ISUP if all ISUP information in a candidate ISUP message is successfully one of defaulted and mapped into SIP headers.

10. The method according to claim 1, wherein the method further comprises:
when constructing an initial INVITE request, an originating SIP endpoint supporting any ISUP procedures includes an indication of support for encapsulated ISUP by at least one of including an Accept header in the INVITE request that indicates support for encapsulated ISUP, and having an encapsulated ISUP IAM;
until an originating SIP endpoint receives indication of support for encapsulated ISUP from a peer SIP signaling entity, by receipt of a SIP message that includes one of an Accept header indicating support for encapsulated ISUP and an encapsulated ISUP message, the originating SIP endpoint not encapsulating any further ISUP messages within a dialog; and
if the originating SIP endpoint receives indication of support for encapsulated ISUP from a peer SIP signaling entity during a dialog, the originating SIP endpoint following ISUP encapsulation procedures for a remainder of the dialog.

11. The method according to claim 9, wherein the method further comprises:
if a terminating SIP endpoint receives an initial INVITE request that includes neither an Accept header indicating support for encapsulated ISUP nor an encapsulated ISUP message, the terminating SIP endpoint not encapsulating any ISUP messages within the dialog.

12. The method according to claim 9, wherein the method further comprises:
if a terminating SIP endpoint supporting any ISUP procedures receives an initial INVITE request that includes one of an Accept header indicating support for encapsulated ISUP and an encapsulated ISUP IAM, the terminating AS following ISUP encapsulation procedures.

13. The method according to claim 1, wherein the method further comprises:
a terminating SIP endpoint rejecting with a SIP 603 (Decline) response an initial SIP INVITE request that includes ISUP MIME that is in a supported and decodable format, that is marked for required handling, and that includes ISUP information that the SIP endpoint does not support and that requires release according to ISUP procedures when unsupported.

14. The method according to claim 1, wherein the method further comprises:
a SIP endpoint rejecting with a 603 (Decline) response to an INFO request that includes ISUP MIME that is in a supported and decodable format, that is marked for required handling, and that includes ISUP information that the SIP endpoint does not support and that requires release according to ISUP procedures when unsupported.

15. The method according to claim 1, wherein the method further comprises:
when a SIP endpoint receives an INFO request that includes ISUP MIME that is in a supported and decodable format, that is marked for required handling, and that includes ISUP information that the SIP endpoint does not support, where none of the unsupported ISUP information requires release according to ISUP procedures when unsupported, the SIP endpoint performing one of rejecting the INFO request with a 603 (Decline) response, invoking the ISUP procedures for the unsupported ISUP information, and ignoring the unsupported ISUP information.

16. The method according to claim 1, wherein the method further comprises:
if a terminating SIP endpoint has not yet sent one of a reliable provisional and a final response to establish a dialog when the INFO request is ready to be sent, sending and receiving acknowledgment for a 183 (Session Progress) reliable provisional response before sending the INFO request;
if the ISUP message to be encapsulated by a terminating SIP endpoint requires no ISUP response and is ignorable by the intended recipient, the terminating SIP endpoint alternately encapsulating the ISUP message in a 183 (Session Progress) reliable provisional response marked for optional handling;
if a terminating SIP endpoint has not yet received acknowledgment for one of a reliable provisional response and final response within a dialog when the INFO request is ready to be sent, waiting for an acknowledgment before sending the INFO request.

17. An apparatus, comprising:

a plurality of networks operatively coupled to one another, and having respective end points; and a single SIP (Session Initiation Protocol) profile useable by each network of the plurality of networks, the single SIP profile usable for SIP bridging networks using ISUP encapsulation and SIP networks serving SIP terminals without ISUP encapsulation;

wherein two end points, via signaling mechanisms within SIP, negotiate a level of support for ISUP (Integrated Services Digital Network User Part) services that are usable between the two end points; and selectively supporting only those portions of ISUP information which are pertinent to supported ISUP services.

18. The apparatus according to claim 17, wherein, for a call, SIP endpoints interoperate whether or not they can decode, recognizes or generate encapsulated ISUP, and wherein encapsulated ISUP is marked with optional disposition to allow calls to proceed normally when the encapsulated ISUP cannot be decoded or recognized by a receiver and information in the encapsulated ISUP is not critical to the call.

19. A method, comprising:

using a single SIP profile for SIP bridging networks using ISUP encapsulation and SIP networks serving SIP terminals without ISUP encapsulation;

negotiating by two endpoints, via signaling mechanisms within SIP (Session Initiation Protocol) via the single SIP profile, a level of support for ISUP (Integrated Services Digital Network User Part) services which are usable between the two endpoints; and selectively supporting only those portions of ISUP information that are pertinent to supported ISUP services;

the single SIP profile having;

an ability to proceed with normal SIP session handling when a SIP entity is unable to either read or understand additional information in encapsulated ISUP when alternate procedures exist for interworking with non-ISUP networks;

an ability to mark SIP messages carrying mandatory ISUP signaling so as to fail a related session or procedure if a respective encapsulated ISUP cannot be read or understood; and an ability to recognize if encapsulated ISUP signaling cannot be read or understood by a peer signaling entity when it is necessary to perform alternate procedures for interworking with non-ISUP networks.

20. The method according to claim 19, wherein the method further comprises SIP endpoints conformant to the SIP profile interoperate irrespective of one of decoding, recognizing, and generating encapsulated ISUP.

* * * * *

UNITED STATES PATENT AND TRADEMARK OFFICE
CERTIFICATE OF CORRECTION

PATENT NO. : 7,668,183 B2  Page 1 of 1
APPLICATION NO. : 11/345908
DATED : February 23, 2010
INVENTOR(S) : Calme et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Twenty-eighth Day of December, 2010

David J. Kappos
*Director of the United States Patent and Trademark Office*